United States Patent [19]

Chiou: Chyi-Fwu et al.

[11] Patent Number: 5,485,326
[45] Date of Patent: Jan. 16, 1996

[54] COMPACT CASSETTE RECORDER CAPABLE OF LOADING DIGITAL OR ANALOGUE CASSETTES AND HAVING A MOVING PIN FOR OPENING A COVER OF A DIGITAL CASSETTE

[75] Inventors: Chyi-Fwu Chiou; Pi-Ling Lin; Sen-Yuan Chien; Wei-Don Lin, all of Hsinchu, Taiwan

[73] Assignee: Industril Technology Research Institute, Hsinchu, Taiwan

[21] Appl. No.: 245,223

[22] Filed: May 17, 1994

[51] Int. Cl.$^6$ .......................... G11B 15/66; G11B 33/02; G11B 5/008
[52] U.S. Cl. .................... 360/96.5; 360/99.06; 369/75.1; 242/338.2
[58] Field of Search .......................... 360/94, 96.5, 96.6, 360/99.02, 99.06, 132, 137; 369/75.1–77.2; 242/338.2

[56] References Cited

U.S. PATENT DOCUMENTS

| | | | |
|---|---|---|---|
| 5,124,975 | 5/1992 | Naoki et al. | 360/99.06 |
| 5,153,867 | 10/1992 | Inoue | 360/99.06 |
| 5,161,079 | 11/1992 | Ohshima et al. | 360/132 |
| 5,231,553 | 7/1993 | Weber et al. | 360/96.5 |
| 5,237,479 | 8/1993 | Vollmann | 360/132 |
| 5,267,706 | 12/1993 | Vollmann | 360/99.06 |
| 5,330,117 | 7/1994 | Taniguchi et al. | 242/540 |

*Primary Examiner*—Robert S. Tupper
*Assistant Examiner*—Jefferson Evans
*Attorney, Agent, or Firm*—W. Wayne Liauh

[57] ABSTRACT

A compact cassette recorder capable of loading digital or analogue cassettes which comprises: (a) a cassette holder which is dimensioned for insertion of a digital or an analogue compact cassette; (b) a base plate mounted in the cassette holder, the base plate being disposed in a parallel relationship with respect to the digital or analogue cassette when the latter is inserted inside the cassette holder; (c) a guiding slot formed on the base plate; (d) a pin mounted in the base plate and is slidable along the guiding slot, the pin has a projecting height which is slight less than the depth of the recessed region of the digital cassette so as to allow the pin to move into the recessed region and in contact with an edge of the digital cassette cover when the digital cassette is inserted into the cassette holder; and (e) a return spring for retaining the pin in the initial position until the pin is being pushed. The guiding slot is so structured to have an initial, an intermediate and an end position such that (a) the pin, while in the initial position, will be received by the recessed region of the digital cassette when the digital cassette is first inserted into the cassette holder, and the initial position of the guiding slot enables the pin to be in a position to open the cover; (b) when the digital cassette is pushed further inside the cassette holder into a working position, the pin is pushed from the initial position to the intermediate position, this movement causes the cover of the digital cassette to open; (c) when an analogue cassette, which does not have a recessed region, is inserted into the cassette holder and pushed into a working position, the pin will be pushed all the way to the end position thus will not interfere with a working of the analogue cassette.

6 Claims, 5 Drawing Sheets

COMPACT CASSETTE RECORDER CAPABLE OF LOADING DIGITAL OR ANALOGUE CASSETTES AND HAVING A MOVING PIN FOR OPENING A COVER OF A DIGITAL CASSETTE

BACKGROUND OF THE INVENTION

The present invention relates to a cassette load/unload device for a digital compact cassette recorder, and particularly to a cassette load/unload device with a simple structure and action.

At present a digital compact cassette usually is designed for use with both digital compact cassettes and conventional analogue compact cassette. Consequently, its cassette load/unload device must be functional for opening up the digital compact cassette cover without affecting the normal operation of the analogue compact cassette.

Referring to FIG. 1, a conventional type cassette load/unload device for a digital compact cassette recorder is comprised of a rocker arm 1 mounted within the sliding slot 3 of base plate 2 by means of a pivot shaft 1A, the sliding slot 3 is vertical to the compact cassette 8 inserted and is able to limit the pivot shaft 1A for reciprocal sliding; and a gear 4 is fixedly connected to the rocker arm 1 and its surface has arc teeth centering around the pivot shaft 1A; and gear rack 5 is parallel to the sliding slot 3 and mounted on the base plate 2 and gearing with the gear 4; and a pin 6 is mounted on the end of said rocker arm 1; and a return spring 7 can enable said rocker arm 1 and gear 4 automatically to return to the original position.

Referring to FIGS. 1 and 2, when digital compact cassette 8 is inserted in the base plate 2, the bottom end of the digital compact cassette 8 will depress the pin 6 at the end of the rocker arm 1 to cause the rocker arm 1 to rotate clockwise and therefore to cause gear 4 rotating and rolling together with gear rack 5 whereby pivot shaft 1A, rocker arm 1 and pin 6 all move toward the right side, and the digital compact cassette cover 8A is thus pushed open by the displacement of pin 6 to attain the purpose of pushing the cover 8A open. When the cassette is ejected, the return spring 7 will push the rocker arm 1, gear 4 and pin 6 back to their original position.

Referring to FIG. 3, when the recorder uses a conventional type analogue cassette, the analogue tape has no cover and the magnetic head and other mechanism stretch directly into the cassette in touch with the tape so that said rocker arm 1 and pin 6 must move to the position without hindering the recorder mechanism from entry of the cassette.

Because the conventional type compact cassette cover opening device must rely on matching with the gear 4 and rack 5 to control the displacement of pin 6, which enables it to push open the digital compact cassette cover and prevents it from affecting the normal use of an analogue compact cassette, the action of the overall mechanism is quite complicated and results in design and manufacturing difficulty as well as the structure of the parts being complicated.

SUMMARY OF THE INVENTION

One object of the present invention is to provide a cassette load/unload device with simple structure and actual action for a digital compact cassette recorder.

Another object of the present invention is to provide a cassette load/unload device with large design flexibility and ease in manufacturing a digital compact cassette recorder.

These and other objectives and advantages of the present invention will become apparent to those skilled in the art after considering the following detailed specification together with the accompanying drawings.

DETAILED DESCRIPTION OF PREFERRED EMBODIMENT

Figure 1:
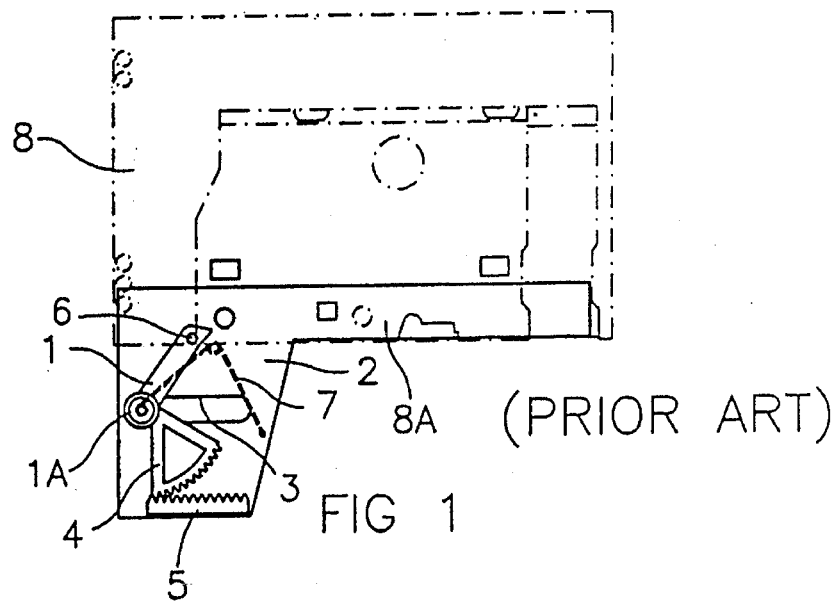
FIG. 1 is the structure of a conventional cassette load/unload device for digital compact cassette recorder.
Figure 2:
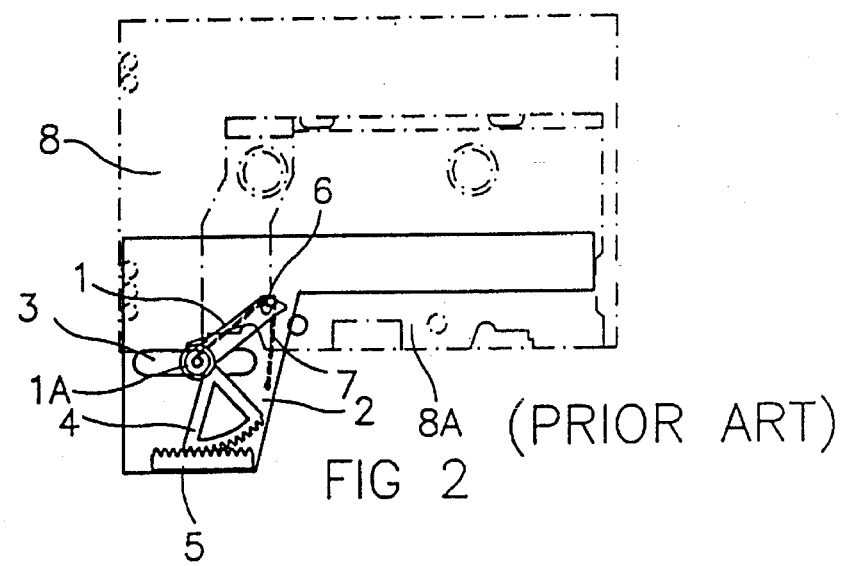
FIG. 2 is a diagram showing the conventional cassette cover for digital compact cassette recorder being pushed open.
Figure 3:
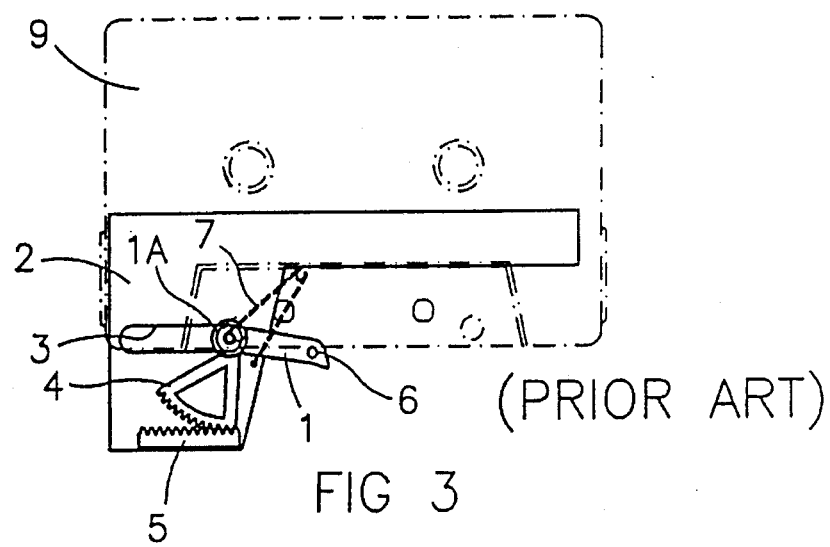
FIG. 3 is a diagram showing the action of the conventional cassette load/unload device for digital compact cassette recorder when analogue cassette is inserted in the cassette holder to reach the end position.
Figure 4:
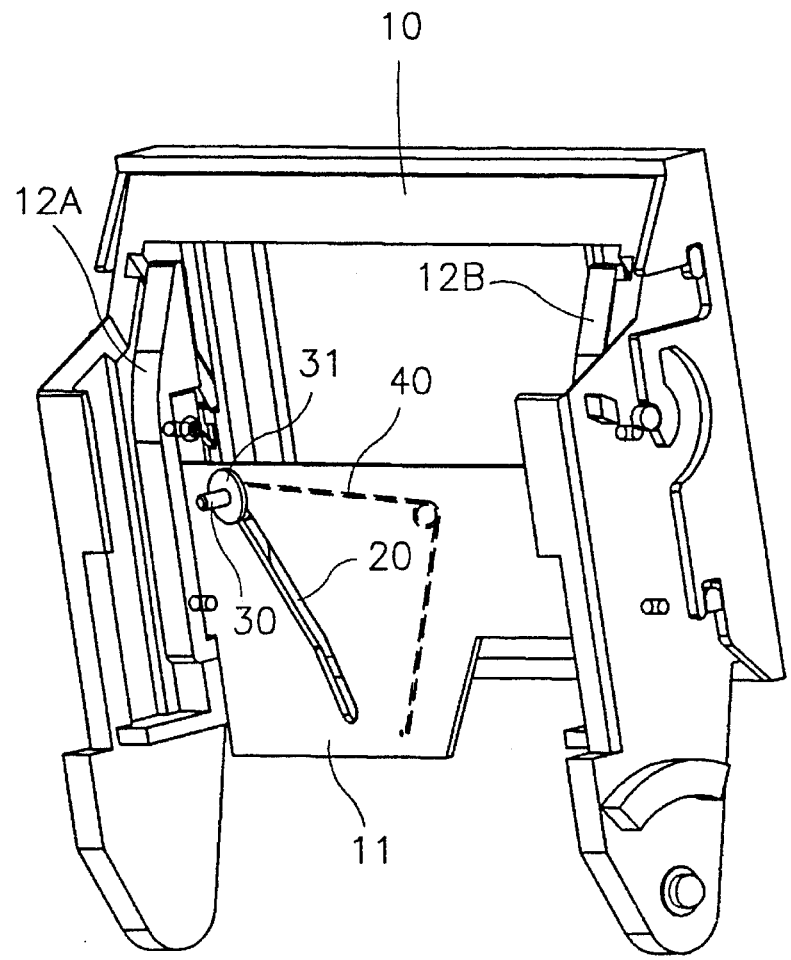
FIG. 4 is an elevational view showing the structure of the present invention.
Figure 5:
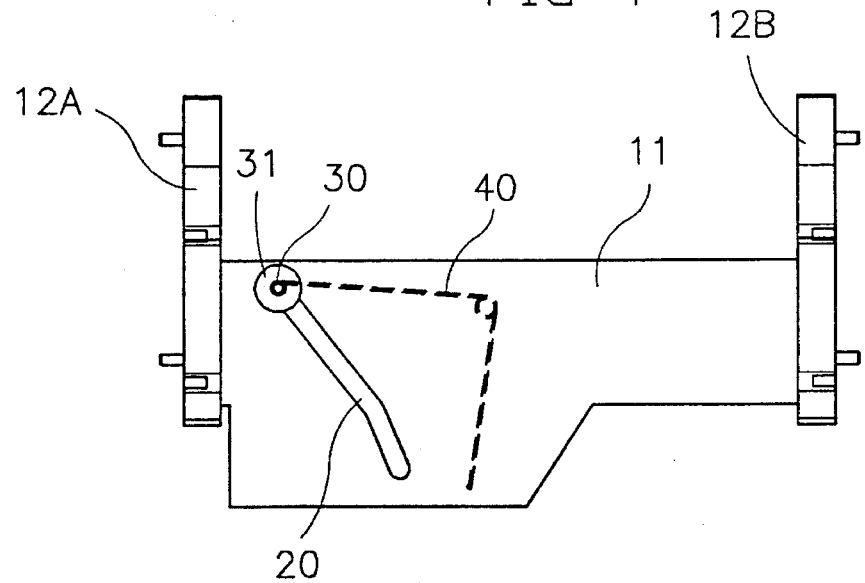
FIG. 5 is a top view showing the mechanism of the present invention to control open/close of digital compact cassette cover.

Referring to FIGS. 4 and 5, the present compact cassette load/unload device for a digital compact cassette recorder is comprised of a base plate 11 on the cassette holder 10; a guiding slot 20 on the base plate 11; a pin 30 slidable along guiding slot 20; and a return spring 40.

Both sides of the base plate 11 are fixed to guide blocks 12A, 12B of cassette holder 10, respectively, and parallel to the surface of the cassette inserted in the cassette holder 10.

On the base plate 11 is an oblique guiding slot 20 and a pin 30 is mounted through the guiding slot 20, and on the pin 30 is a flange 31 to match a washer 32 for setting the pin 30 on the upper and lower sides of the base plate 11 which prevents the pin 30 from leaving off the guiding slot 20.

Figure 6:
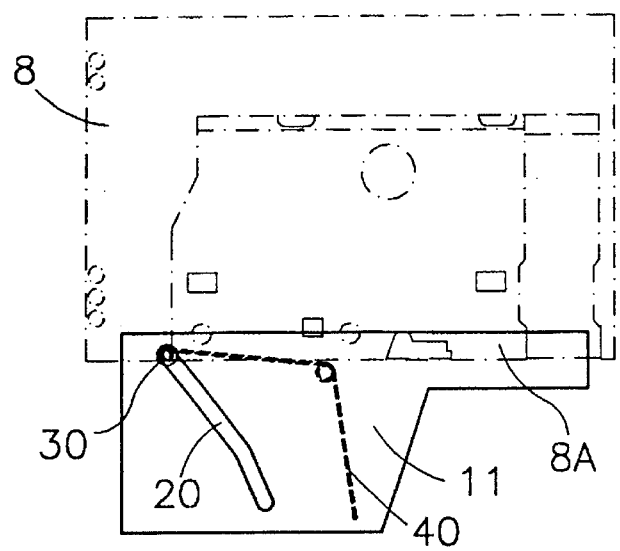
FIG. 6 is a top view showing the present invention has reached initial position when digital compact cassette is inserted in the cassette holder.
Figure 7:
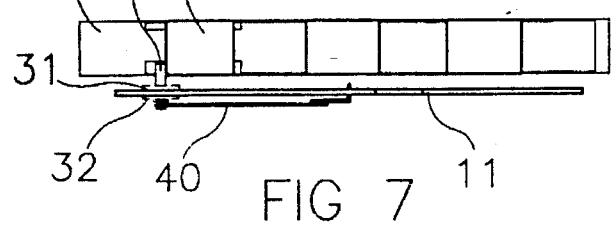
FIG. 7 is a front view showing the present invention has reached working position when digital compact cassette of the present invention is inserted in the cassette holder.

Referring to FIGS. 6 and 7, the end of the pin 30 facing the cassette is vertically projecting over the surface of the base plate 11 and the projecting height is adequate for setting on the edge of the digital compact cassette 8 cover 8A while not to affect the positioning of the digital compact cassette 8.

When a digital compact cassette 8 is inserted in the cassette holder 10 along the guide blocks 12A, 12B of cassette holder 10, pin 30 will be pushed by the digital compact cassette 8 to slide along guiding slot 20. The initial position of the guiding slot 20 enables pin 30 to locate on the side of closed cover 8A of digital compact cassette 8 whereby upon insertion of said digital compact cassette 8 in the cassette holder 10 pin 30 will set on the edge of the cassette cover 8A.

In addition, the end of the guiding slot 20 resembles an incline toward the opening direction of the cassette cover. When the digital compact cassette 8 continues to push, pin 30 will move toward the opening direction of the cover 8A due to the guiding by the guiding slot 20 so that the cassette cover 8A is pushed open.

Figure 8:
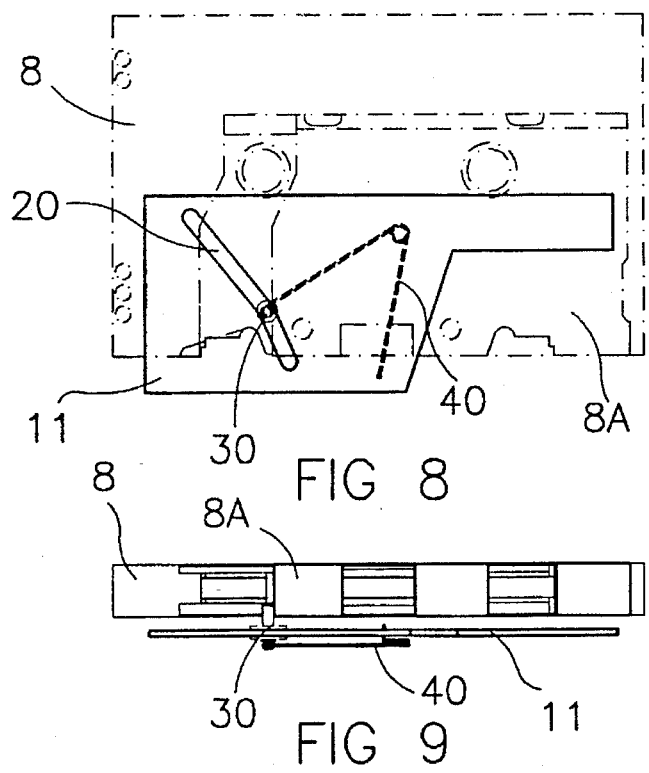
FIG. 8 is a top view showing the present invention has reached working position when digital compact cassette is inserted in the cassette holder for showing digital compact cassette cover is pushed open.
Figure 9:
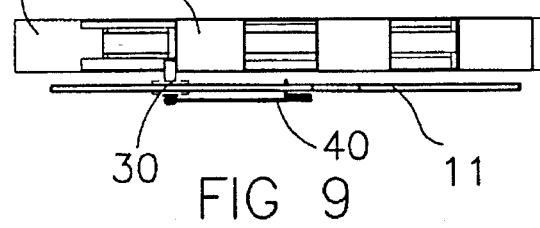
FIG. 9 is a front view showing the present invention has reached its working position when a digital compact cassette is inserted in the cassette holder.

Referring to FIGS. 8 and 9, when the digital compact cassette 8 is inserted to reach its working position, pin 30 will move to the position for pushing the cassette cover 8A to open fully.

When the digital compact cassette 8 is ejected, pin 30 will be pushed back by a return spring 40 to the original position of the guiding slot 20. The return spring 40 is a torsional spring with one end fixed to the base plate 11 while the other end connected to pin 30. When pin 30 is pushed by the digital compact cassette 8 the return spring 4 will be compressed; when the digital compact cassette 8 is ejected the return spring 40 will employ a resilience to push pin 30 back to its original position.

Figure 10:
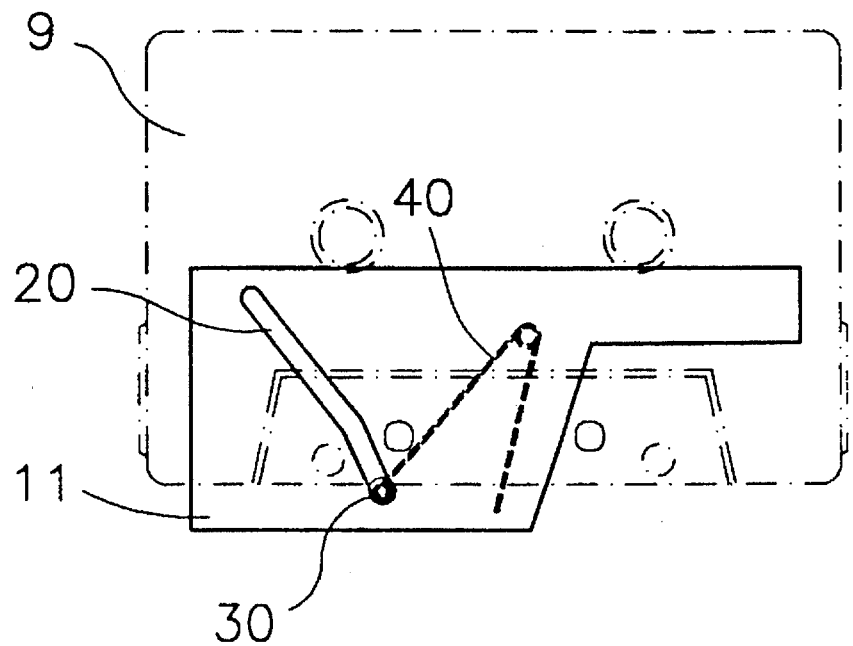
FIG. 10 is a top view showing the present invention has reached its working position when an analogue compact cassette is inserted in the cassette holder.

In addition, when the present invention is used with the conventional analogue compact cassette, the guiding slot 20 will guide pin 30 to the position so as not to affect the normal use of an analogue compact cassette 9. Referring to FIG. 10, when an analogue compact cassette 9 is inserted into a deeper position of cassette holder 10 than a digital compact cassette 8 is inserted whereby when the analogue compact cassette 9 is inserted to reach its working position, pin 30 is pushed to the end position of the guiding slot.

Figure 11:
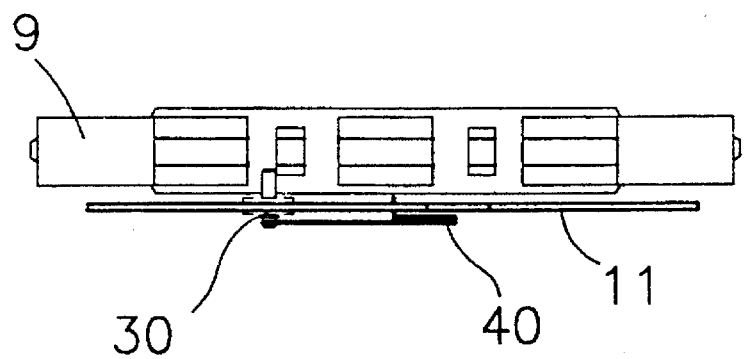
FIG. 11 is a front view showing the present invention has reached its working position when an analogue compact cassette is inserted in the cassette holder and for showing the position relationship between the pin and analogue cassette under the state of the present invention as shown in FIG. 10.
Figure 12:
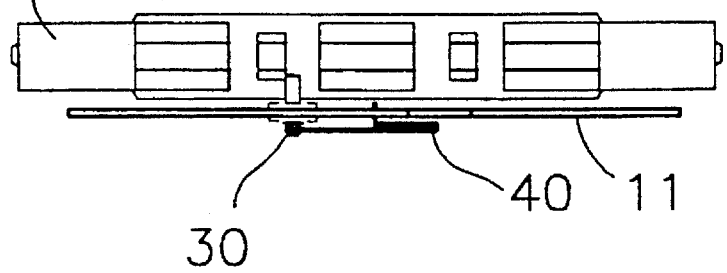
FIG. 12 is another front view showing the present invention has reached its working position when an analogue compact cassette is inserted in the cassette holder and for showing another position relationship between the pin and analogue cassette.

When pin 30 has reached the end position of the guiding slot 20, pin 30 will be located as shown in FIG. 11. At this moment pin 30 will prevent magnetic head or other mechanism in touch with the tape from entering the cassette which enables the normal use of analogue compact cassette 9. In addition, pin 30 will stay at the stay position as shown in FIG. 12 when the analogue compact cassette 9 is inserted to reach its working position, and such stay position will be permitted if only to keep away from the opening of the analogue compact cassette 9.

Figure 13:
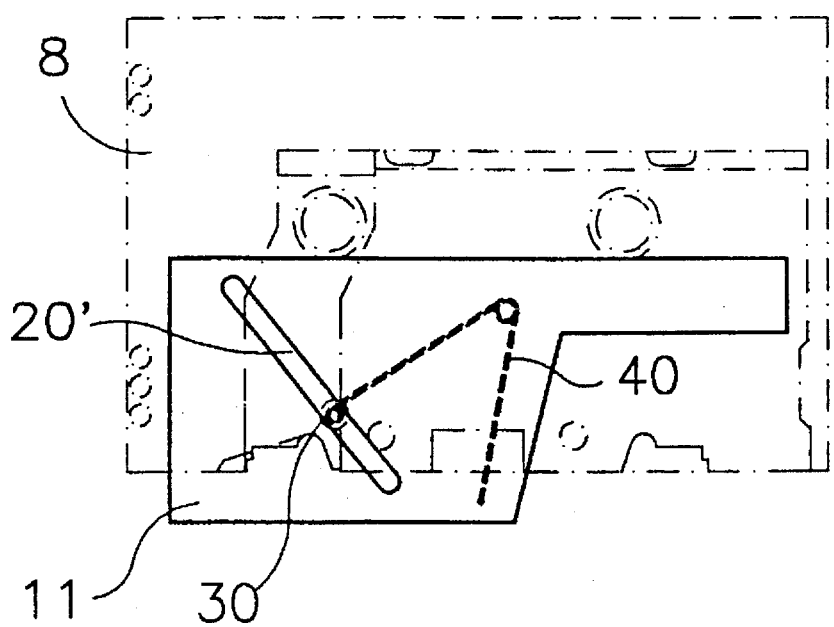
FIG. 13 is another varied structure of the guiding slot of the present invention to match the digital compact cassette for showing a digital compact cassette cover is pushed open according to the embodiment.
Figure 14:
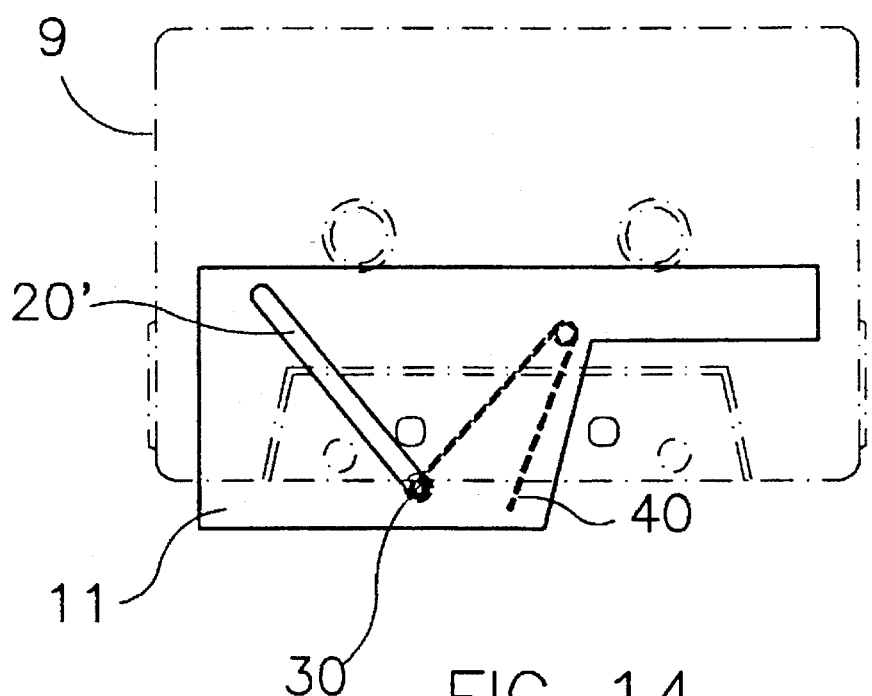
FIG. 14 is the embodiment shown in FIG. 13 to match an analogue compact cassette.

Referring to FIGS. 13 and 14, the guiding slot 20 of the present invention may also be designed as a linear guiding slot 20' not to be limited as the shape of two-stage guidance as shown in the embodiment.

Through the assembly of the aforesaid components, the present invention may attain the purpose of pushing open the digital compact cassette cover so as to not affect the normal use of a conventional analogue compact cassette so that it may carry out the load/unload job for both digital and analogue compact cassettes. Compared to the conventional cassette load/unload device, the present invention applies a bevel guiding slot 20 to control the action of pin 30, without requiring such components, as the gear and rack, so that its structure is greatly simplified. In addition, the design for the said guiding slot 20 route is quite easy, i.e. if only to change the shape of guiding slot 20 said pin 30 displacement may match the stroke of the cassette and therefore reach the correct position whereby actual action of the present mechanism can be ensured. In addition, because of the greater flexibility in design, it is easier for manufacturing.

We claim:

1. A cassette load/unload device for use in a digital compact cassette recorder, said digital compact cassette having a recessed region with a predetermined depth and a cover which is in a normally closed position but can be pushed to open in a first direction, said cassette load/unload device comprising:

a cassette holder which is dimensioned for insertion of a digital compact cassette or an analogue compact cassette;

a base plate mounted in said cassette holder, said base plate being disposed in a parallel relationship with respect to said digital or analogue compact cassette when inserted inside said cassette holder;

a guiding slot formed on said base plate;

a pin mounted in said base plate, said pin is mounted vertically projecting over a surface of said base plate and is slidable along said guiding slot, and said pin has a projecting height which is slight less than said depth of recessed region of said digital compact cassette so as to allow said pin to move into said recessed region and in contact with an edge of said digital cassette cover when said digital cassette is inserted into said cassette holder;

said guiding slot having an initial position, a intermediate position and an end position;

a return spring for retaining said pin in said initial position until said pin is being pushed;

wherein said guiding slot is so structured such that said pin, while in said initial position, will be received by said recessed region of said digital cassette when said digital cassette is first inserted into said cassette holder and said initial position of said guiding slot enables said pin to be in a position to open said cover;

said guiding slot is also structured such that when said digital cassette is pushed further inside said cassette holder into a working position, said pin is pushed from said initial position to said intermediate position, thus causing said cover to open;

said guiding slot is further structured such that when an analogue cassette, which does not have a recessed region is inserted into said cassette holder and pushed into a working position, said pin will be pushed all the way to said end position thus will not interfere with a working of said analogue cassette; and said returning spring is structured to return said pin to said initial position in said guiding slot when said digital cassette or said analogue cassette is ejected from said cassette holder.

2. The cassette load/unload device for digital compact cassette recorder as claimed in claim 1 wherein said guiding slot is a two-stage oblique guiding slot.

3. The cassette load/unload device for digital compact cassette recorder as claimed in claim 1 wherein said guiding slot is a linear guiding slot.

4. The cassette load/unload device for digital compact cassette recorder as claimed in claim 1 wherein said return spring has one end fixed to said base plate and the other end connected to said pin.

5. The cassette load/unload device for digital compact cassette recorder as claimed in claim 1 wherein said pin is provided with a flange, which, in conjunction with a washer prevents said pin from moving away from said guiding slot.

6. A compact cassette recorder capable of loading digital or analogue cassettes, said digital cassette having a recessed region with a predetermined depth and a cover which is in a nodally closed position but can be pushed to open in a first direction, said cassette recorder having a cassette loading/unloading mechanism, which comprises:

- a cassette holder which is dimensioned for insertion of a digital cassette or an analogue compact cassette;
- a base plate mounted in said cassette holder, said base plate being disposed in a parallel relationship with respect to said digital or analogue cassette when inserted inside said cassette holder;
- a guiding slot formed on said base plate;
- a pin mounted in said base plate, said pin being mounted vertically projecting over a surface of said base plate and is slidable along said guiding slot, and said pin has a projecting height which is slight less than said depth of said recessed region of said digital cassette so as to allow said pin to move into said recessed region and in contact with an edge of said digital cassette cover when said digital cassette is inserted into said cassette holder;
- said guiding slot having an initial position, a intermediate position and an end position;
- a return spring for retaining said pin in said initial position until said pin is being pushed;
- wherein said guiding slot is so structured such that said pin, while in said initial position, will be received by said recessed region of said digital cassette when said digital cassette is first inserted into said cassette holder and said initial position of said guiding slot enables said pin to be in a position to open said cover;
- said guiding slot is also structured such that when said digital cassette is pushed further inside said cassette holder into a working position, said pin is pushed from said initial position to said intermediate position, thus causing said cover to open;
- said guiding slot is further structured such that when an analogue cassette, which does not have a recessed region is inserted into said cassette holder and pushed into a working position, said pin will be pushed all the way to said end position thus will not interfere with a working of said analogue cassette; and
- said returning spring is structured to return said pin to said initial position in said guiding slot when said digital cassette or said analogue cassette is ejected from said cassette holder.

* * * * *